US011163459B2

(12) United States Patent
Chiu et al.

(10) Patent No.: US 11,163,459 B2
(45) Date of Patent: Nov. 2, 2021

(54) REKEYING INFORMATION ON STORAGE DEVICES USING A PROACTIVE COPY SERVICE

(71) Applicant: EMC IP Holding Company LLC, Hopkinton, MA (US)

(72) Inventors: Naizhong Chiu, Newton, MA (US); Ping Zhang, Shrewsbury, MA (US); Xuan Tang, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/665,334

(22) Filed: Oct. 28, 2019

(65) Prior Publication Data

US 2021/0124504 A1    Apr. 29, 2021

(51) Int. Cl.
*G06F 3/06* (2006.01)
*H04L 9/08* (2006.01)

(52) U.S. Cl.
CPC .......... *G06F 3/0622* (2013.01); *G06F 3/0607* (2013.01); *G06F 3/0647* (2013.01); *G06F 3/0689* (2013.01); *H04L 9/0891* (2013.01)

(58) Field of Classification Search
CPC ............ G06F 13/1668; G06F 13/4027; G06F 2009/45579; G06F 2009/45595; G06F 3/0604; G06F 3/061; G06F 3/0647; G06F 3/0659; G06F 3/0679; G06F 9/45558
See application file for complete search history.

(56) References Cited

U.S. PATENT DOCUMENTS

| | | | |
|---|---|---|---|
| 7,493,458 B1 | 2/2009 | Kemeny et al. | |
| 9,336,092 B1 | 5/2016 | Junxu | |
| 9,722,788 B1 | 8/2017 | Natanzon et al. | |
| 10,013,323 B1 | 7/2018 | Puhov et al. | |
| 10,013,325 B1 | 7/2018 | Garrett, Jr. et al. | |
| 10,152,254 B1 | 12/2018 | Kang et al. | |
| 10,346,247 B1 | 7/2019 | Gao et al. | |
| 10,459,814 B2 | 10/2019 | Gao et al. | |
| 10,852,982 B2 | 12/2020 | Kang et al. | |
| 10,922,201 B2 | 2/2021 | Ma et al. | |
| 2016/0285625 A1* | 9/2016 | Roth | H04L 9/083 |

* cited by examiner

*Primary Examiner* — Yong J Choe
(74) *Attorney, Agent, or Firm* — BainwoodHuang

(57) ABSTRACT

A technique rekeys information to maintain data security. The technique involves identifying a first storage drive as a source device available to a proactive copy service. The technique further involves identifying a set of second storage drives as a set of spare devices available to the proactive copy service. The technique further involves invoking the proactive copy service which, in response to being invoked, transfers information from the first storage drive to the set of second storage drives. The information is encrypted by a first key when residing on the first storage drive and is encrypted by a set of second keys when residing on the set of second storage drives, the first key being different from each second key.

20 Claims, 6 Drawing Sheets

REKEYING INFORMATION ON STORAGE DEVICES USING A PROACTIVE COPY SERVICE

BACKGROUND

Conventional data storage systems store host data within storage disks on behalf of host computers. Such a conventional data storage system may configure its storage disks as a redundant array of independent disks (RAID) group which enables data reconstruction in the event of a failed disk (e.g., by implementing RAID Level 5, RAID Level 6, RAID Level 10, etc.).

Additionally, such a conventional data storage system may label a storage disk as being on the verge of failing if that storage disk encounters a predefined number of media errors within a certain period of time. In response to labeling the storage disk as being on the verge of failing, the conventional data storage system may perform a proactive disk copying routine that proactively copies data and parity from the failing storage disk to an available backup storage disk in an attempt to avoid or minimize data and parity reconstruction.

SUMMARY

Another feature available on some data storage systems is rekeying data at rest, i.e., a mechanism that changes data encryption keys for data currently residing on storage disks. Unfortunately, some data storage systems are not able to provide such a data at rest rekey feature. For example, some data storage systems may not be able to provide data at rest rekeying due to hardware limitations.

Improved techniques are directed to rekeying information on storage devices using a proactive copy service. Along these lines, suppose that a first storage device stores information which is encrypted using a first key assigned to the first storage device. Further suppose that the first key has been in use for some time to protect the information on the first storage device thus posing a greater security risk. In such a situation, a proactive copy service may be invoked for the first storage device while the first storage device consistently operates normally, and is deemed to be (or is labeled) as healthy (i.e., not failing). The invoked proactive copy service reads the encrypted information from the first storage device, decrypts the encrypted information into exposed information using the first key, re-encrypts the exposed information into re-encrypted information using a second key assigned to a second storage device, and writes the re-encrypted information to the second storage device. Alternatively, the proactive copy service may re-encrypt the exposed information using multiple second keys assigned to multiple storage devices and then write the re-encrypted information to the multiple storage devices (e.g., a mapped RAID pool scenario). Accordingly, the information is effectively rekeyed using the proactive copy service thus maintaining data security.

One embodiment is directed to a method of rekeying information to maintain data security. The method includes identifying a first storage drive as a source device available to a proactive copy service. The method further includes identifying a set of second storage drives as a set of spare devices available to the proactive copy service. The method further includes invoking the proactive copy service which, in response to being invoked, transfers information from the first storage drive to the set of second storage drives. The information is encrypted by a first key when residing on the first storage drive and is encrypted by a set of second keys when residing on the set of second storage drives, the first key being different from each second key.

In some arrangements, invoking the proactive copy service includes triggering the proactive copy service. The proactive copy service (e.g., a routine, an operation, a feature, etc.) then read encrypted data from the first storage drive identified as the source device, decrypts the encrypted data into exposed data using the first key, re-encrypts the exposed data into re-encrypted data using the set of second keys, and writes the re-encrypted data on to the set of second storage drives identified as the set of spare devices.

In some arrangements, the first storage drive and the set of second storage drives reside within a data storage array that performs data storage operations on behalf of a set of hosts. Additionally, the data storage array is constructed and arranged to provide the proactive copy service to proactively copy data from identified source devices to identified spare devices when the identified source devices are deemed to be in end-of-life (EOL) states. Furthermore, triggering the proactive copy service includes setting an EOL marker for the first storage drive before the first storage drive naturally reaches the EOL state to begin a proactive copy operation which transfers the information from the first storage drive to the second storage drive while the data storage array performs data storage operations on behalf of the set of hosts.

In some arrangements, the method further includes, after the proactive copy operation has completed, clearing the EOL marker for the first storage drive. Such clearing enables the first storage drive to operate as a healthy source device.

In some arrangements, invoking the proactive copy service further includes prior to triggering the proactive copy service, detecting that a time of life for the first key has reached a predetermined value. Additionally, the proactive copy service is triggered in response to detecting that the time of life for the first key has reached the predetermined value.

In some arrangements, the method further includes, after the re-encrypted data has been written on to the set of second storage drives, identifying the first storage drive as a spare device available to the proactive copy service. Such operation enables the proactive copy service to write information from another storage drive to the first storage drive.

In some arrangements, the first storage drive belongs to a plurality of storage drives of a redundant array of independent disks (RAID) group. Additionally, the method further includes invoking the proactive copy service for each storage drive of the plurality of storage drives other than the first storage drive to fully rekey information of the RAID group.

In some arrangements, the first storage drive belongs to a plurality of storage drives of a mapped redundant array of independent disks (RAID) pool. Additionally, the method further includes invoking the proactive copy service for each storage drive of the plurality of storage drives other than the first storage drive to fully rekey information of the mapped RAID pool.

In some arrangements, identifying the first storage drive as the source device available to the proactive copy service includes enabling the proactive copy service to obtain access to the first key from a key server that manages a respective cryptographic key for each storage drive. Additionally, identifying the second storage drive as the spare device available to the proactive copy service includes enabling the proactive copy service to obtain access to the second key from the key server.

Another embodiment is directed to data storage equipment configured to rekey information to maintain data security. The data storage equipment includes memory, and control circuitry coupled to the memory. The memory stores instructions which, when carried out by the control circuitry, cause the control circuitry to:

(A) identify a first storage drive as a source device available to a proactive copy service,
(B) identify a set of second storage drives as a set of spare devices available to the proactive copy service, and
(C) invoke the proactive copy service which, in response to being invoked, transfers information from the first storage drive to the set of second storage drives, the information being encrypted by a first key when residing on the first storage drive and being encrypted by a set of second keys when residing on the set of second storage drives, the first key being different from each second key.

Yet another embodiment is directed to a computer program product having a non-transitory computer readable medium which stores a set of instructions to rekey information to maintain data security. The set of instructions, when carried out by computerized circuitry, causing the computerized circuitry to perform a method of:

(A) identifying a first storage drive as a source device available to a proactive copy service;
(B) identifying a set of second storage drives as a set of spare devices available to the proactive copy service; and
(C) invoking the proactive copy service which, in response to being invoked, transfers information from the first storage drive to the set of second storage drives, the information being encrypted by a first key when residing on the first storage drive and being encrypted by a set of second keys when residing on the set of second storage drives, the first key being different from each second key.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in rekeying information on storage devices using a proactive copy service.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to rekeying information on storage devices using a proactive copy service. Along these lines, suppose that a first storage device stores information which is encrypted using a first key assigned to the first storage device. Further suppose that the first key has been in use for some time to protect the information on the first storage device thus posing a greater security risk. In such a situation, a proactive copy service may be invoked for the first storage device even though the first storage device consistently operates normally, and is deemed to be or is marked as healthy (i.e., the first storage device is not deemed to be failing). The invoked proactive copy service reads encrypted information from the first storage device, decrypts the encrypted information into exposed information using the first key, re-encrypts the exposed information into re-encrypted information using a second key assigned to a second storage device, and writes the re-encrypted information to the second storage device. Alternatively, the proactive copy service may re-encrypt the exposed information using multiple second keys assigned to multiple storage devices and then write the re-encrypted information to the multiple storage devices (e.g., a mapped RAID pool scenario). As a result, the information is effectively rekeyed using the proactive copy service thus maintaining data security.

Figure 1:
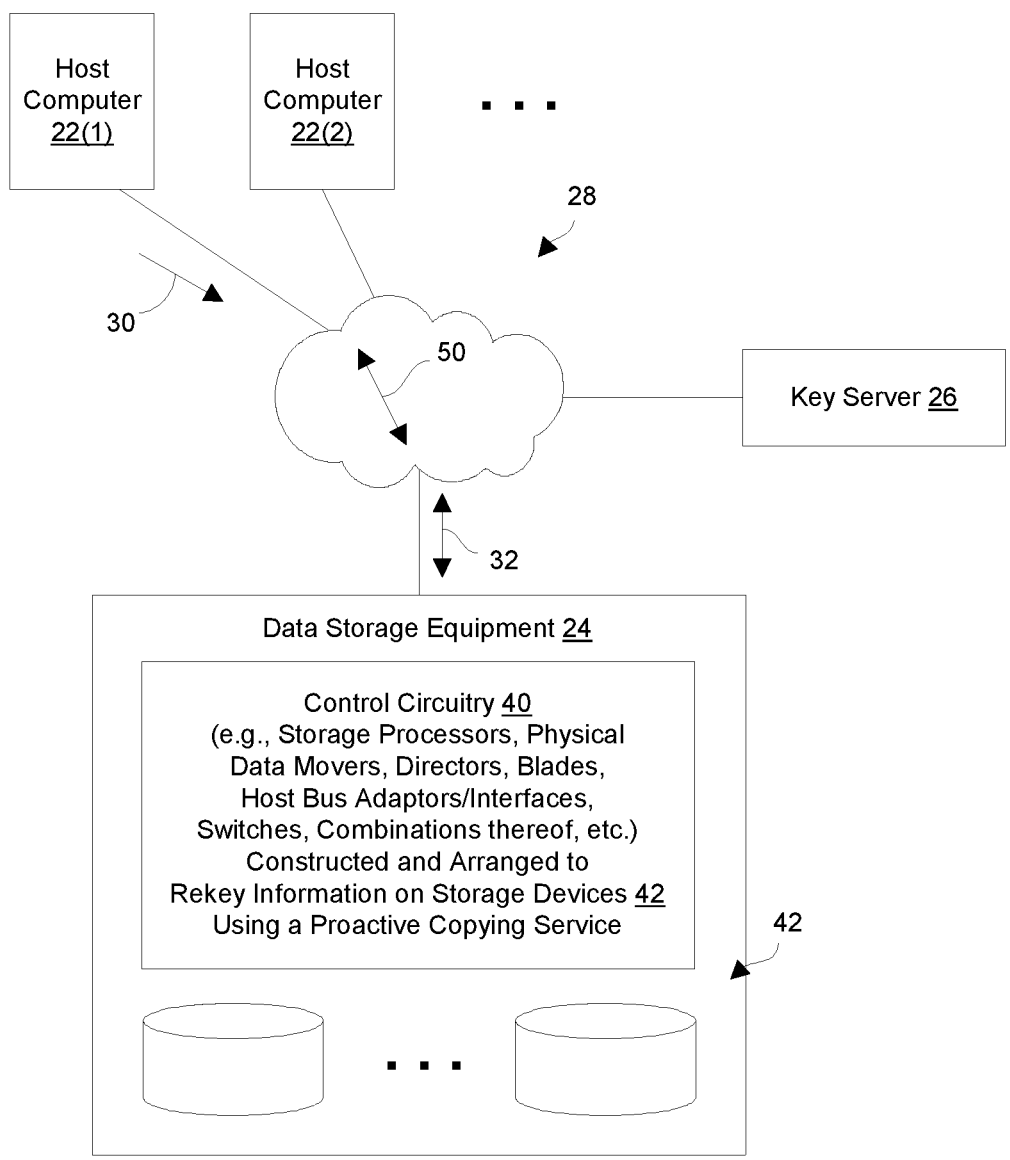
FIG. 1 is a block diagram of a data storage environment which performs rekeying of information on storage devices using a proactive copy service in accordance with certain embodiments.

FIG. 1 shows a data storage environment 20 which performs rekeying of information on storage devices using a proactive copy service in accordance with certain embodiments. The data storage environment 20 includes host computers 22(1), 22(2), . . . (collectively, host computers 22), data storage equipment 24, a key server 26, and a communications medium 28.

Each host computer 22 is constructed and arranged to perform useful work. For example, a host computer 22 may operate as a web server, a file server, an email server, an enterprise server, and so on, which provides I/O requests 30 (e.g., small computer system interface or SCSI commands) to the data storage equipment 24 to store host data 32 in and read host data 32 from the data storage equipment 24.

The data storage equipment 24 includes control circuitry 40 and storage drives (or devices) 42, e.g., solid state devices, magnetic disks, etc. The control circuitry 40 may be formed by one or more physical storage processors, data movers, director boards, blades, I/O modules, host bus adaptors/interfaces, storage drive controllers, switches, combinations thereof, and so on. The control circuitry 40 is constructed and arranged to process the I/O requests 30 from the host computers 22 by robustly and reliably storing host data 32 within the storage drives 42 and retrieving the host data 32 from the storage drives 42. Additionally, as will be explained in further detail shortly, the control circuitry 40 rekeys information stored within the storage drives 42 using a proactive copy service which is further available to proactively copy data and parity from the failing storage drives 42 (i.e., storage drives 42 that have been determined and marked to be on the verge of failing) to spare storage drives 42 in an attempt to avoid or minimize data and parity reconstruction.

It should be understood that, during such a proactive copying phase, the circuitry involved keeps track of the progress and makes sure that new writes are properly directed. Moreover, such proactive copying does not put a RAID group or a pool in degraded mode.

In accordance with some embodiments, the control circuitry 40 of the data storage equipment 24 further supports hosting. That is, the control circuitry 40 provides a virtual server environment thus alleviating the need for external hosts although the data storage environment 20 may still include one or more host computers 22. In such embodiments, users and/or applications are able to operate directly within (i.e., are "unified" within) the data storage equipment 24. Such a unified storage situation may deliver file-based and/or block-based data storage services.

The key server 26 is constructed and arranged to manage cryptographic keys. To this end, the key server 26 assigns a respective cryptographic key to each storage drive 42 of the data storage equipment 24 thus enabling the data storage equipment 24 to encrypt/decrypt information on each storage drive 42 using a different key for security.

In some embodiments, the key server 26 is external to the data storage equipment 24 thus making the key server 26 well-suited for managing cryptographic keys for multiple data storage equipment installations (e.g., different data storage systems, assemblies, enclosures, etc.). In other embodiments, the key server 26 resides within the data storage equipment 24 thus enabling key management to be performed entirely locally for enhanced security.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the control circuitry 40 of the data storage equipment 24 processes the I/O requests 30 from the host computers 22. In particular, the control circuitry 40 stores host data 32 in the storage drives 42 and loads host data 32 from the storage drives 42 on behalf of the host computers 22 and/or internal hosts.

In some embodiments, the control circuitry 40 configures the storage drives 42 as one or more redundant array of independent disks (RAID) groups which enables data recovery/reconstruction in the event of a failed disk. A variety of different RAID Levels are suitable for use for each RAID group (e.g., RAID Level 1, RAID Level 5, RAID Level 6, RAID Level 10, etc.).

In some embodiments, the control circuitry 40 configures the storage drives 42 as one or more mapped RAID pools. Again, a variety of different RAID Levels are suitable for use for each RAID pool (e.g., RAID, Level 1, RAID Level 5, RAID Level 6, RAID Level 10, etc.).

The control circuitry 40 keeps the keys that the key server 26 has assigned to the storage drives 42 separated from the storage drives 42. When the control circuitry 40 stores information on a storage drive 42, the control circuitry 40 encrypts that information using the particular key that is assigned to that storage drive 42. Accordingly, if the storage drive 42 is ever compromised (e.g., lost, stolen, misplaced during transport, etc.), the encrypted information on the storage drive 42 remains secure because the information cannot be decrypted without the particular key.

Moreover, the encrypted information on the storage drive 42 may be effectively destroyed by simply destroying the assigned key. Although the storage drive 42 further may be zeroed out or overwritten to erase the encrypted information, such a process is unnecessary if the key is destroyed.

It should be understood that the control circuitry 40 provides a proactive copy service to proactively copy information from a failing storage drive 42 before the storage drive 42 actually fails. By proactively copying the information from the failing storage drive 42 to a healthy storage drive 42, there is no need to reconstruct the information from other storage drives 42 (e.g., via more expensive and time consuming operations involving reading information from the other storage drives 42 and XOR'ing that information). Accordingly, the proactive copy service may lessen the impact of a failing storage drive 42 on certain other resources within the data storage equipment 42 and shorten the amount of time, if any, that the data storage equipment 42 is susceptible to data loss (e.g., due to a failure of another storage drive 42).

To this end, the control circuitry 40 monitors the number of media errors each storage drive 42 encounters over a predefined period of time. If this number of media errors for a particular storage drive 42 exceeds a predetermined threshold, the control circuitry 40 launches (or triggers) the proactive copy service to perform a proactive copy operation that transfers the information from the particular storage drive 42 (i.e., the failing storage drive 42) to another storage drive 42 (e.g., a hot spare).

In particular, the control circuitry 40 maintains a data structure for each storage drive 42 and the data structure includes an end-of-life (EOL) marker. If the EOL marker is cleared (i.e., not set) for a storage drive 42, the control circuitry 40 considers the storage drive 42 to be healthy. However, if the EOL marker for that storage drive 42 is set (i.e., not cleared), the control circuitry 40 considers that storage drive 42 to be unhealthy (or failing).

In response to detecting that the number of media errors for a particular storage drive 42 exceeds the predetermined threshold, the control circuitry 40 sets the EOL marker for that storage drive 42 (i.e., marks that storage drive 42 as unhealthy). When the EOL marker for that storage drive 42 is set, the proactive copy service transfers information from that storage drive 42 to one or more different storage drives 42.

During this information transfer, the proactive copy service uses the key assigned to the unhealthy storage drive 42 to decrypt the information on that storage drive 42. The proactive copy service then re-encrypts the information using one or more other keys when writing the information to one or more other storage drives 42.

It should be further understood that particular value for the predetermined threshold depends on the predefined period of time that is used to count media errors (e.g., a minute, an hour, a day, a week, a month, a year, the storage drive lifetime, etc.). Moreover, in accordance with certain embodiments, the predetermined threshold and/or the predefined period of time may be modified (or tuned), e.g., due to customer tolerance, based on a service level agreement, and so on.

The control circuitry 40 is further constructed and arranged to periodically rekey information on the storage drives 42. Such rekeying involves transferring information from one healthy storage drive 42 to another healthy storage drive 42. To this end, the control circuitry 40 leverages off of the available proactive copy service.

Before rekeying information from a healthy storage drive 42, the storage drive 42 is identified as a source device available to the proactive copy service. Accordingly, a data structure exists for the storage drive 42 and the EOL marker of the data structure is initially clear since the storage drive 42 is healthy. That is, the storage drive 42 is deemed to be healthy because the number of media errors for the predefined time period is below the predetermined threshold.

Additionally, a second healthy storage drive 42 is identified as a spare device to the proactive copy service. For example, the second healthy storage drive 42 may be a hot spare storage drive 42 that is not currently in use, but is simply set aside for utility purposes.

When the control circuitry 40 is ready to rekey information on the first healthy storage drive 42, the control circuitry 40 sets the EOL marker for the first healthy storage drive 42 (e.g., the marker is changed from a de-asserted value to an asserted value). In response, the proactive copy service performs a proactive copy operation on the first healthy storage drive 42 to transfer the information from the first healthy storage drive 42 to the second healthy storage drive 42. As the information is read from the first healthy storage drive 42, the information is decrypted using the key that the key server 26 assigned to the first healthy storage drive 42. Additionally, as the information is written to the second healthy storage drive 42, the information is re-encrypted using the key that the key server 26 assigned to the second healthy storage drive 42. As a result, the information is now safely stored in re-encrypted form on the second healthy storage drive 42 and security is maintained (i.e., the information has been rekeyed). Further details will now be provided with reference to FIG. 2.

Figure 2:
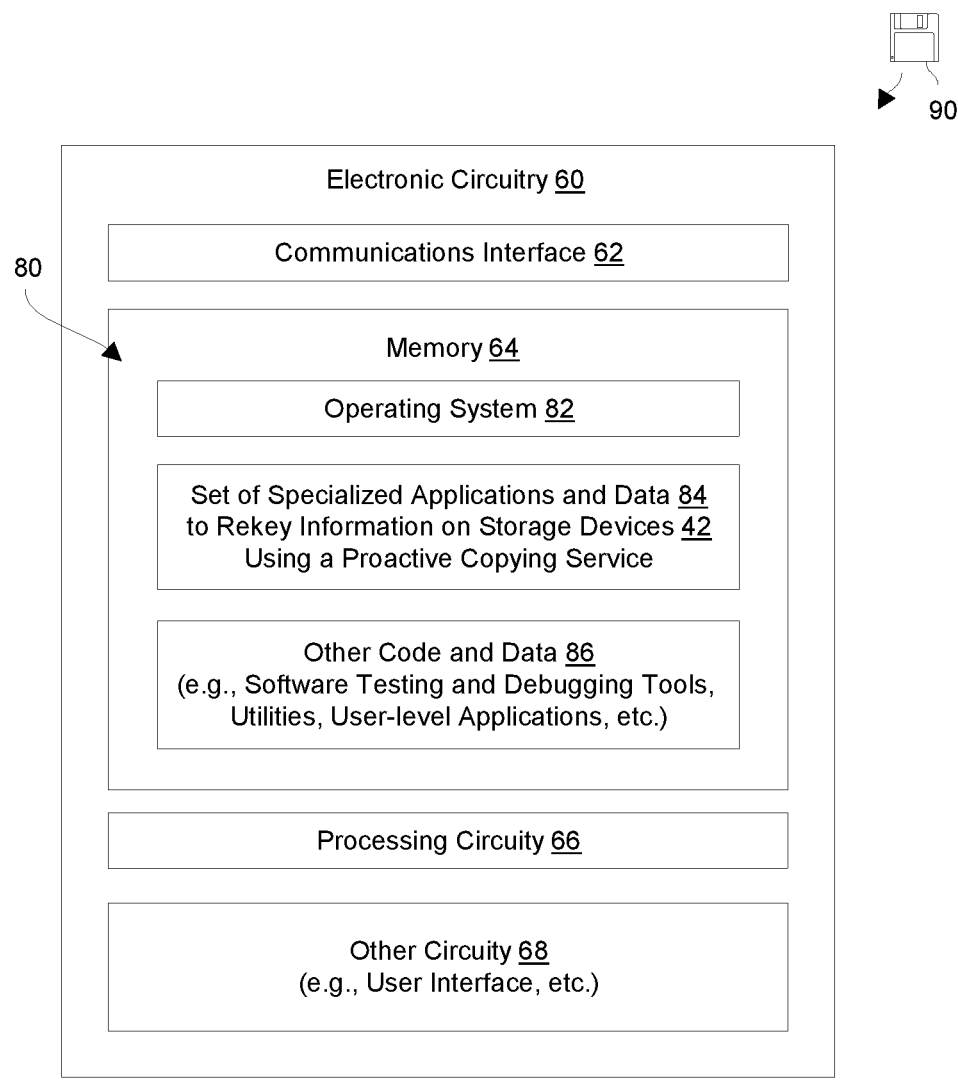
FIG. 2 is a block diagram of electronic circuitry of the data storage environment of FIG. 1 in accordance with certain embodiments.

FIG. 2 is a block diagram of electronic circuitry 60 which is suitable for at least a portion of the control circuitry 40 of the data storage equipment 24 (also see FIG. 1) in accordance with certain embodiments. The electronic circuitry 60 includes a communications interface 62, memory 64, and processing circuitry 66, and other circuitry 68.

The communications interface 62 is constructed and arranged to connect the electronic circuitry 60 to the communications medium 28 (also see FIG. 1) to enable communications with other devices of the data storage environment 20 (e.g., the host computers 22, the key server 26, user devices, etc.). Such communications may be IP-based, SAN-based, cellular-based, cable-based, fiber-optic based, wireless, cloud-based, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 80 including an operating system 82, a set of specialized applications and data 84, and other applications and data 86. The operating system 82 is intended to refer to specialized code such as a kernel to manage resources of the electronic circuitry 60 (e.g., processor cycles, memory space, etc.), drivers, and so on. The set of specialized applications and data 84 includes specialized code that rekeys information stored within the storage drives 42 using a proactive copying service. In some arrangements, the specialized applications and data 84 may be tightly integrated with the operating system 82 or even form part of the operating system 82. The other applications and data 86 represent other constructs for other operations such as software testing and debugging tools, software for a virtual server environment, user-level applications, other administrative tools, utilities, and so on.

The processing circuitry 66 is constructed and arranged to operate in accordance with the various software constructs 80 stored in the memory 64. In particular, the processing circuitry 66 operates in accordance with the set of specialized applications and data 84 to form specialized circuitry which, among other things, rekeys information stored within the storage drives 42 using the proactive copying service. Such specialized circuitry may be further implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 108 of the electronic circuitry 60 represents additional circuits, components, and other hardware such as a user interface (or terminal) that enables a user to enter commands and/or configure the electronic circuitry 60 for configuration changes, tuning purposes, testing, and so on. Further details will now be provided with reference to FIGS. 3 through 5.

Figure 3:
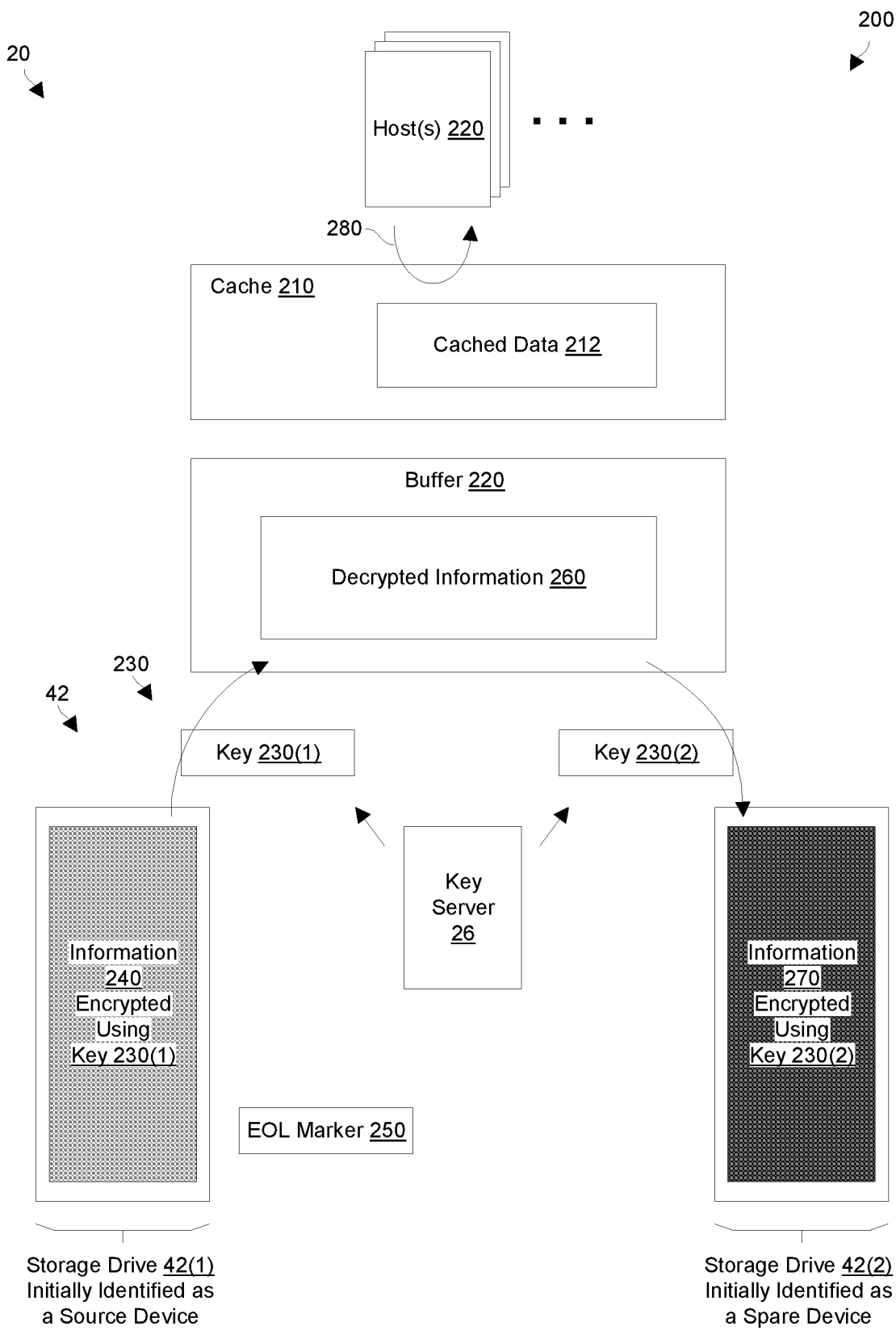
FIG. 3 is a block diagram illustrating particular details of rekeying using the proactive copy service on a pair of storage devices in accordance with certain embodiments.
Figure 4:
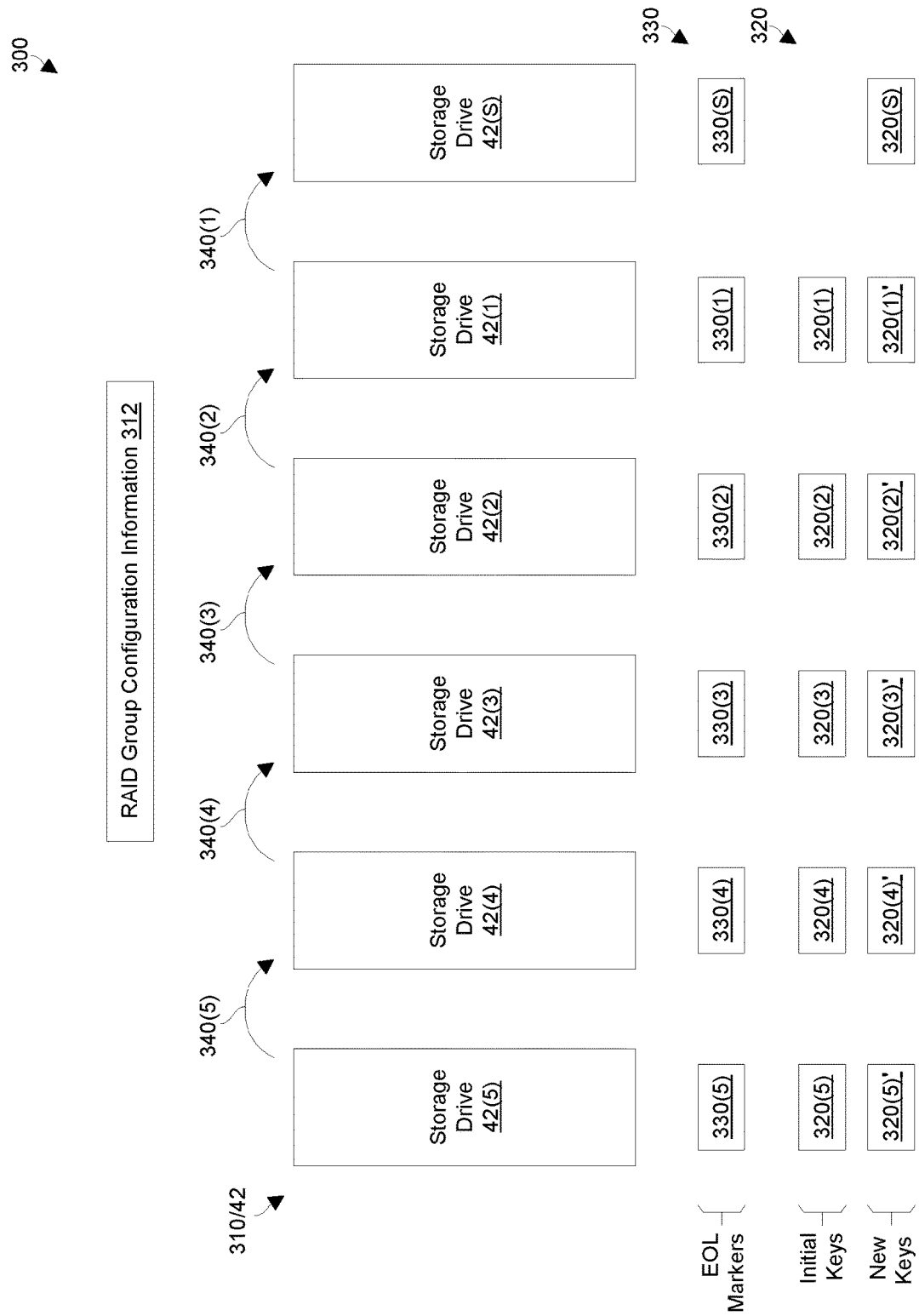
FIG. 4 is a block diagram illustrating particular details of rekeying using the proactive copy service on a RAID group in accordance with certain embodiments.
Figure 5:
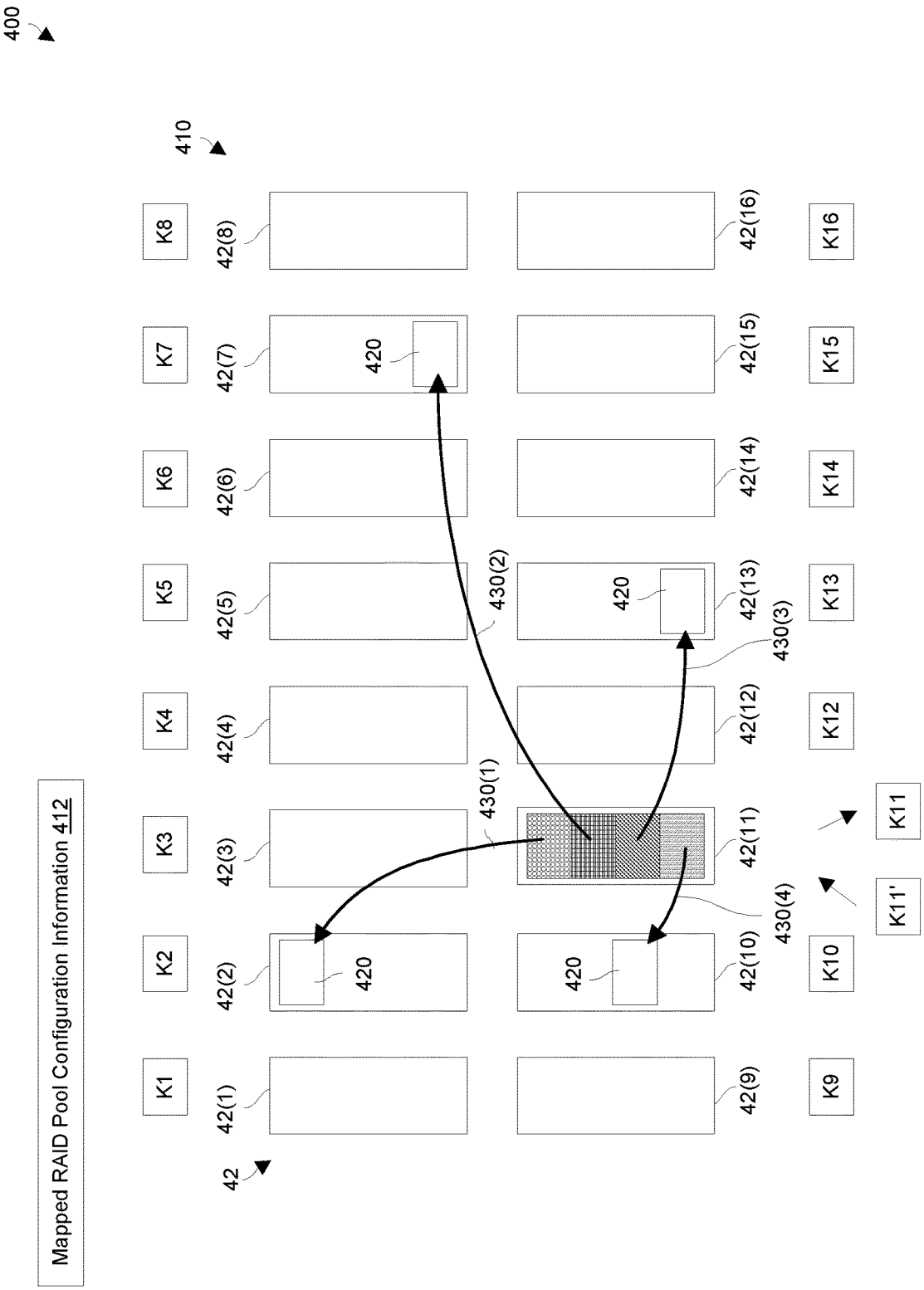
FIG. 5 is a block diagram illustrating particular details of rekeying using the proactive copy service on a mapped RAID pool in accordance with certain embodiments.

FIGS. 3 through 5 provide details of various example rekeying scenarios in accordance with certain embodiments. FIG. 3 shows a basic example 200 for rekeying information using the proactive copy service in accordance with certain embodiments. FIG. 4 shows a RAID group rekeying example 300 using the proactive copy service in accordance with certain embodiments. FIG. 5 shows a mapped RAID pool rekeying example 400 using the proactive copy service in accordance with certain embodiments.

With reference to FIG. 3, various portions of the data storage environment 20 are shown in connection with a basic example 200. In particular, the data storage equipment 24 includes a cache 210 which may form a portion of the I/O stack (or path) to the storage drives 42 (also see the memory 64 in FIG. 2 and the control circuitry 40 in FIG. 1). The cache 210 temporarily holds cached data 212 such as host data 32 written to the data storage equipment 24 to be stored in a non-volatile manner on the storage drives 42. Additionally, the cached data 212 may further include host data 32 read from the storage drives 42 so that a subsequent attempted access to the same host data 32 results in a cache hit and does not require re-reading that host data 32 from the storage drives 42 for faster response time.

As further shown in FIG. 3, the data storage equipment 24 further includes a buffer 220 for temporarily holding data during rekeying. That is, the buffer 220 may provide work space during decryption and/or encryption activities. In accordance with certain embodiments, the buffer 220 is separate and distinct from the cache 210 so as to prevent or minimize resource contention (e.g., the system cache is not consumed so certain I/O performance is not impacted, etc.).

Additionally shown in FIG. 3 are healthy storage drives 42 which are involved in the basic rekeying example 200, and respective keys 230 assigned to the storage drives 42 by the key server 26 (also see FIG. 1). In particular, the storage drive 42(1) initially stores encrypted information 240 for rekeying, and is assigned a key 230(1). It should be understood that, during the rekeying process, the encrypted information 240 is still available for access by one or more hosts. That is, new encrypted information 240 may be written to the storage drive 42(1), the existing encrypted information 240 that currently resides on the storage drive 42(1) may be read, and so on.

Furthermore, the storage drive 42(2) initially is a hot spare, and is assigned a key 230(2) by the key server 26. In some embodiments, the key server 26 assigns the key 230(2) to the storage drive 42(2) ahead of time (e.g., when formatted, when identified as a hot spare, when activated, etc.). In other embodiments, the key server 26 assigns the key 230(2) to the storage drive 42(2) at the beginning of the rekeying process.

At this point, it should be clear that the control circuitry 40 has identified the storage drive 42(1) as the source device, and the storage drive 42(2) as the destination device for the rekeying process. To initiate information rekeying, the control circuitry 40 sets the EOL marker 250 for the storage drive 42(1).

It should be understood that prior to setting the EOL marker 250, the EOL marker 250 was clear because the storage drive 42(1) is healthy. Accordingly, with the EOL marker now set, the proactive copy service performs a proactive copy operation on the storage drive 42(1) even though the storage drive 42(1) is actually healthy (i.e., as monitored by the control circuitry 40, the number of media errors for the storage drive 42(1) does not exceed the predetermined threshold).

By way of example, the control circuitry 40 may automatically set the EOL marker 250 in response to a rekeying schedule that is internally maintained. Alternatively, an administrator may provide a command to the control circuitry 40 to initiate rekeying of the information 240 on the storage drive 42(1). Other situations to initiate rekeying are suitable as well (e.g., initiation by the key server 26, in response to a detected tamper event/alert, etc.).

In response to setting the EOL marker 250 for the storage drive 42(1), the proactive copy service reads and decrypts the encrypted information 240 from the storage drive 41(1) using the key 230(1). The proactive copy service stores that data as decrypted information 260 in the buffer 220.

While decrypting of the encrypted information 240 into the decrypted information 260 takes place, the proactive copy service also reads the decrypted information 260 from the buffer 220 and re-encrypts that information 260 using the key 230(2) assigned to the storage drive 42(2) into re-encrypted information 270. The proactive copy service writes the re-encrypted information 270 into the storage drive 42(2).

It should be understood that during such rekeying using the proactive copy service may occur independently of host I/O operations. For example, as illustrated in FIG. 3, there is no performance impact when reading the cached data 212 from the cache 210 (arrow 280) in response to host requests.

Once all of the encrypted information 240 on the storage drive 42(1) has been transferred to the storage drive 42(2) as the re-encrypted information 270, the key 230(1) assigned to the storage drive 42(1) is destroyed. This may involve updating the key server 26 to deny further access to the key 230(1), deleting the key 230(1), etc. Accordingly, the re-encrypted information 270 that now resides on the storage drive 42(2) has been rekeyed to maintain security and the original encryption information 240 on the storage drive 42(1) is no longer accessible.

As explained above, the proactive copy service generates portions of the decrypted information 260 from the encrypted information 240 while concurrently re-encrypting other portions of the decrypted information 260 for writing to the storage drive 42(2). Such embodiments alleviate the need for the buffer 220 to hold all of the decrypted information 260 all at once. However, in other embodiments in which there is enough space available in the buffer 220 to hold all of the decrypted information 260 at once, the proactive copying service may complete decryption before beginning re-encryption.

At this point, the control circuitry 40 confirms that the storage drive 42(1) is still healthy (recall that the control circuitry 40 monitors the number of media errors that each storage drive 42 encounters over the predefined period of time). If the storage drive 42(1) is still healthy, the control circuitry 40 clears the EOL marker 250 to make the storage drive 42(1) available for reuse. Along these lines, the control circuitry 40 may identify the storage drive 42(1) as a new hot spare in place of the storage drive 42(2) (recall that the storage drive 42(2) was designated as a hot spare prior to the rekeying process). If the storage drive 42(1) is not healthy, the control circuitry 40 may perform one or more remedial activities (e.g., output an alert to notify an administrator, allocate/activate a new hot spare, etc.).

FIG. 4 shows a RAID group rekeying example 300. In particular, the example 300 extends the application of particular concepts of the basic example 200 (also see FIG. 3) to rekey information residing on each storage drive 42 of a RAID group 310.

As shown in FIG. 4, the RAID group 310 includes five storage drives 42, and the control circuitry 40 of the data storage equipment 24 (FIG. 1) manages the RAID group 310 using RAID group configuration information 312. Such a situation is well suited for RAID Level 5, and more particularly RAID5(4+1). However, it should be understood that five storage drives 42 are included by way of example only, and that other numbers of storage drives 42 and other RAID Levels are suitable for use as well.

In the context of RAID Level 5, the information within the RAID group 310 is organized as data and parity segments (or extents) which are distributed with in a staggered manner among the storage drives 42. The information (data and parity) on any particular storage drive 42 of the RAID group 310 can be reconstructed by performing XOR operations on the remaining information on the other storage drives 42 of the RAID group 310.

In the example 300, each storage drive 42 has been assigned an initial key 320 by the key server 26 and has an EOL marker 330 indicating that the storage drive 42 is currently healthy. Recall that the proactive copy service is constructed and arranged to perform a proactive copy operation on any storage drives 42 that have a set EOL marker 330. Along these lines, the storage drive 42(1) is assigned key 320(1) and has an EOL marker 330(1) that is currently clear. Similarly, the storage drive 42(2) is assigned key 320(2) and has an EOL marker 330(2) that is currently clear, the storage drive 42(3) is assigned key 320(3) and has an EOL marker 330(3) that is currently clear, the storage drive 42(4) is assigned key 320(4) and has an EOL marker 330(4) that is currently clear, the storage drive 42(5) is assigned key 320(5) and has an EOL marker 330(1) that is currently clear.

To rekey the information in the RAID group 310, the control circuitry 40 utilizes a hot spare storage drive 42(S) and rekeys information from a source device to a destination device in a rotational manner. To this end, the control circuitry 40 may select storage drives 42 one at a time based on the RAID group configuration information 312. During the rekeying process, the RAID group 310 is still operational. For example, data within the RAID group 310 can be written, read, modified. Also, data can be reconstructed from the remaining storage drives 42 in the event of a failure of one of the storage drives 42, and so on.

To begin rekeying, the control circuitry 40 directs the key server 26 to assign a key 320(S) to the hot spare storage drive 42(S) and identifies the storage drive 42(S) to the proactive copy service as a suitable destination device. The control circuitry 40 then sets the EOL marker 330(1) for the storage drive 42(1) to invoke (e.g., trigger or launch) the proactive copy service.

In response, the proactive copy service performs a proactive copy operation that uses the storage drive 42(1) as the source device and the hot spare storage drive 42(S) as the destination device. Accordingly, the proactive copy service transfers information from the storage drive 42(1) to the storage drive 42(S) in the manner as explained above in connection with the basic example 200 (also see FIG. 3).

In particular, the proactive copy service reads encrypted information from the storage drive 42(1) and decrypts that encrypted information into decrypted information using the key 320(1) current assigned to the storage drive 42(1). Additionally, the proactive copy service re-encrypts the decrypted information using the key 320(S) currently assigned to the storage drive 42(S) and stores the re-encrypted information in the storage drive 42(S). The details of such a transfer were explained earlier with reference to the basic example 200 (FIG. 3) and is illustrated in FIG. 4 via arrow 340(1) for simplicity.

After the re-encrypted information has been written to the storage drive 42(S), the control circuitry 42 updates the RAID group configuration information 312 to indicate that the RAID group 310 now includes the storage drive 42(S) in place of the storage drive 42(1). That is, access operations performed on the RAID group 310 no longer involve the storage drive 42(1). Additionally, in the event of a failure of one of the storage drives 42 of the RAID group 310, data can be reconstructed from the remaining storage drives 42, and so on.

Furthermore, the control circuitry 40 confirms that the storage drive 42(1) is still healthy (recall that the control circuitry 40 monitors the number of media errors that each storage drive 42 encounters over the predefined period of time). If the storage drive 42(1) is still healthy, the control circuitry 40 clears the EOL marker 330(1) to make the storage drive 42(1) available for reuse and identifies the storage drive 42(1) as a new hot spare. If the storage drive 42(1) is not healthy, the control circuitry 40 may perform one or more remedial activities (e.g., output an alert to notify an administrator, allocate a new hot spare, etc.).

If the storage drive 42(1) has been confirmed to still be healthy, the control circuitry 40 directs the key server 26 to assign a new key 330(1)' to the storage drive 42(1). Accordingly, the storage drive 42(1) is available to hold new data.

At this point, the control circuitry 40 selects the storage drive 42(2) for rekeying (e.g., based on accessing the RAID group configuration information 312). In particular, the control circuitry 40 identifies the storage drive 42(2) as the source device and the storage drive 42(1) as the destination device. The control circuitry 40 then sets the EOL marker 330(2) to invoke the proactive copy service which responds by rekeying encrypted information from the storage drive 42(2) on to the storage drive 42(1) (arrow 340(2) in FIG. 4).

In the RAID group example 300, the rekeying process continues until the information originally on the storage drives 42(5), 42(4), 42(3), 42(2), 42(1) has been respectively transferred to storage drive 42(4), 42(3), 42(2), 42(1), 42(S). Such operation is illustrated by arrows 340(5), 340(4), 340(3), 340(2), 340(1). Upon completion of the rekeying process, the information within the RAID group example 300 is now protected via new keys 320(4)', 320(3)', 320(2)', 320(1)', 320(S). Moreover, the storage drives 42 are still healthy to robustly and reliably perform data storage operations.

In some embodiments, the example 300 may continue so that the re-encrypted information on the storage drive 42(S) is moved on to the storage drive 42(5). Here, the proactive copy service may be invoked by setting the EOL marker 330(S) for the storage drive 42(S). In these embodiments, the RAID group 310 includes the same storage drives 42 that belonged to the RAID group 310 prior to rekeying, and the storage drive 42(S) is again a hot spare. Moreover, one the information is moved from the storage drive 42(S) to the storage drive 42(5), the key 330(S) may be destroyed and another key may be assigned to the storage drive 42(S).

FIG. 5 shows a mapped RAID pool rekeying example 400. In particular, the example 400 extends the application of the basic example 200 (also see FIG. 3) to rekey information residing on each storage drive 42 of a mapped RAID pool 410.

As shown in FIG. 5, the mapped RAID pool 410 includes 16 storage drives 42, and the control circuitry 40 manages segments (or drive extents) 420 of each storage drive 42 in accordance with a mapped RAID architecture. In particular, the control circuitry 40 creates RAID extents from the segments 420 to provide RAID protection for the pool 410. For example, the control circuitry 40 may create a RAID extent containing five drive extents to provide RAID5(4+1) protection. Other RAID Levels and types of protection are suitable as well (e.g., RAID5(8+1), RAID6(6+2), RAID6 (14+2), and so on).

It should be understood that the storage drives 42(1), . . . 42(16) are assigned respective keys K1, . . . , K16 by the key server 26. Moreover, the control circuitry 40 periodically rekeys the information on the storage drives 42(1), . . . 42(16) to maintain security.

In accordance with certain embodiments, one technique to rekeying information within the mapped RAID pool 410 involves including a hot spare storage drive 42 and rotating through each storage drive 42 of the mapped RAID pool 410 to rekey information from that storage drive 42. In particular, the control circuitry 42 may designate the hot spare storage drive 42 as a destination device and a first storage drive 42 of the mapped RAID pool 410 as the source device and then invoke the proactive copy service (e.g., by setting the EOL marker for that source device 42). This process results in a new key assigned to the destination device by the key server 26 so that the source device information is re-encrypted by the new key, as well as designating the original source device at a new hot spare once the information is transferred to the destination device (also see the basic example 200 in FIG. 3).

The control circuitry 40 then repeats this operation on the next storage drive 42 of the mapped RAID pool 410 in a manner similar to that of rotating through the storage drives 42 of the RAID group 310 mentioned in the RAID group example 300 (also see FIG. 4) until information from all of the storage drives 42 of the mapped RAID pool 410 has been rekeyed.

In accordance with other embodiments, an alternative technique does not involve rekeying information using a hot spare storage drive 42. Rather, in this alternative technique, the control circuitry 40 confirms that sufficient storage space is currently available within unused (or spare) segments 420 of the mapped RAID pool 410 to support a proactive copy operation in which all of the information on a storage drive 42 can be re-located to unused segments 420 on other storage drives 42 which currently use non-stale (or newer) keys. Then, the information from a source device is rekeyed to multiple destination devices and the unused segments 420 which receive the information may strategically reside on different storage drives 42 to satisfy the particular RAID protection scheme. The control circuitry 40 may then invoke the proactive copy service on each of the remaining storage drives 42 of the mapped RAID pool 410 one at a time to rekey the information on that storage drive 42.

As shown in FIG. 5, the proactive copy service rekeys information from the storage drive 42(11) that was encrypted by key K11. For example, the proactive copy service rekeys a first segment 420 of information on the storage drive 42(11) to an available segment 420 on the storage drive 42(2) (see arrow 430(1) in FIG. 5). Additionally, the proactive copy service rekeys a second segment 420 of information on the storage drive 42(11) to an available segment 420 on the storage drive 42(7) (arrow 430(2)), a third segment 420 of information to an available segment 420 on the storage drive 42(10) (arrow 430(3)), and a fourth segment 420 of information to an available segment 420 on the storage drive 42(13) (arrow 430(4)). This transfer continues for any other segments on the storage drive 42(11) until all of the segments 420 on the storage drive 42(11) have been rekeyed. Since the keys used by the destination devices are not stale, security is maintained. Moreover, the proactive copy service updates the mapped RAID pool configuration information 412 with the new locations of the information segments 420 so that RAID protection continues.

The control circuitry 40 then confirms that the storage drive 42(11) is still healthy and, if so, the control circuitry makes the storage drive 42(11) available for reuse. To this end, the control circuitry 40 directs key server 26 to assign a new key K11' to the storage drive 42(11). In particular, the key K11 is destroyed and any new information that is written to the storage drive 42(11) is encrypted using the new key K11'.

The control circuitry 40 then proceeds to rekey information from another storage drive 42 of the mapped RAID pool 410. It should be understood that some information segments 420 will be encrypted using the new key 11' and written to the storage drive 42(11) since the storage drive 42(11) has available space. Each time another storage drive 42 has been processed by the proactive copy service, that storage drive 42 is assigned a new key by the key server 26. Accordingly, the information of the mapped RAID pool 410 is effectively rekeyed and the storage drives 42 of the mapped RAID pool 410 are now provisioned with new keys. Further details will now be provided with reference to FIG. 6.

Figure 6:
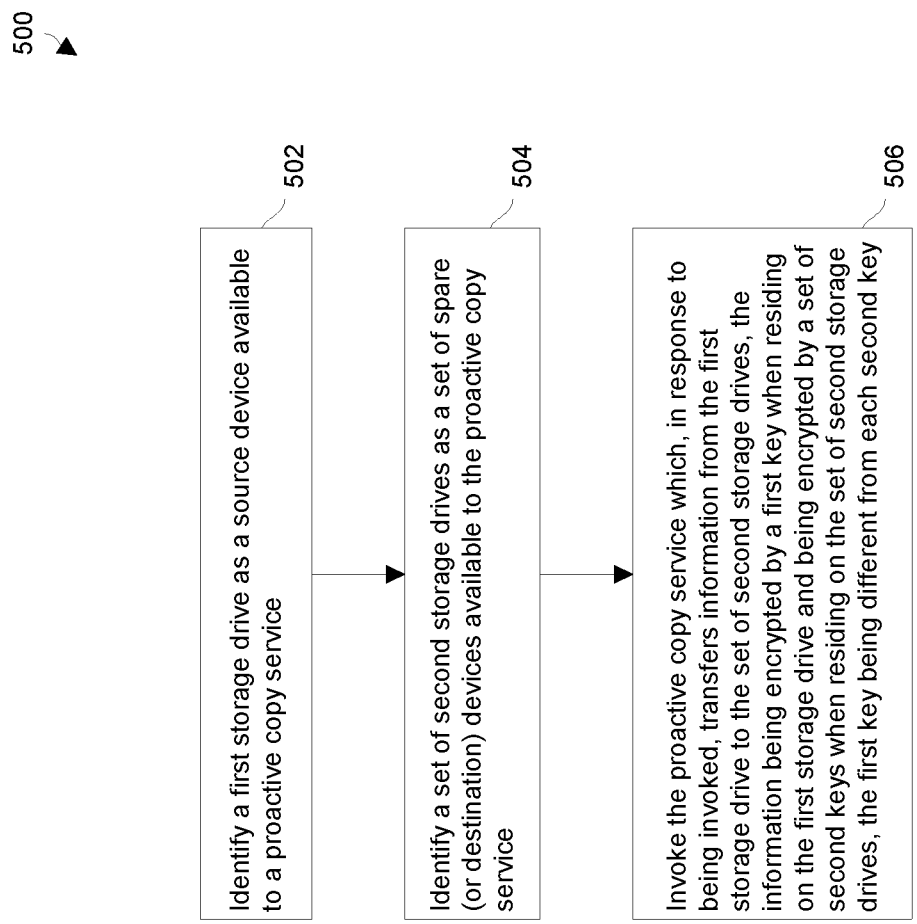
FIG. 6 is a flowchart of a procedure which is performed by the data storage environment of FIG. 1 in accordance with certain embodiments.

FIG. 6 is a flowchart of a procedure 500 for rekeying information to maintain data security which is performed by the data storage environment 20 (FIG. 1) in accordance with certain embodiments. The procedure 500 may be performed by specialized circuitry within the data storage environment 20 (e.g., see the control circuitry 40 of the data storage equipment 24 in FIG. 1).

At 502, the specialized circuitry identifies a first storage drive as a source device available to a proactive copy service.

At 504, the specialized circuitry identifies a set of second storage drives as a set of spare devices available to the proactive copy service.

At 506, the specialized circuitry invokes the proactive copy service which, in response to being invoked, transfers information from the first storage drive to the set of second storage drives. The information is encrypted by a first key when residing on the first storage drive and is encrypted by a set of second keys when residing on the set of second storage drives, the first key being different from each second key.

It should be understood that the procedure 500 may be performed as in the basic example 200 (also see FIG. 3). Additionally, the procedure 500 may be repeated to rekey information of a RAID group as in the RAID group example 400 (also see FIG. 4). Furthermore, the procedure 500 may be repeated to rekey information of a mapped RAID pool as in the mapped RAID pool example 500 (also see FIG. 5). Other applications are suitable for use as well.

As described above, improved techniques are directed to rekeying information on storage drives 42 using a proactive copy service. Along these lines, suppose that a first storage drive 42 stores data which is encrypted with a first key assigned to the first storage drive 42. Although the data on the first storage drive 42 has been encrypted using the first key, further suppose that the first key has been in use for a lengthy amount of time thus posing a greater security risk. In such a situation, a proactive copy service may be invoked for the first storage drive 42 while the first storage drive 42 is healthy. The invoked proactive copy service reads the encrypted data from the first storage drive 42, decrypts the encrypted data into exposed data using the first key, re-encrypts the exposed data into re-encrypted data using a second key assigned to a second storage drive 42, and writes the re-encrypted data to the second storage drive 42. Accordingly, the information is effectively rekeyed using the proactive copy service thus maintaining data security.

One should appreciate that the above-described techniques do not merely decrypting and encrypting data. Rather, the disclosed techniques involve utilizing a proactive copy mechanism which is provided within data storage equipment to re-locate data from a failing storage drive before the storage drive ultimately fails in an attempt to reduce or avoid data reconstruction. Such techniques maintain security even if rekeying is not supported by certain underlying hardware, leverages off of existing proactive copy features, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Some may take the view that the best security practice, which could be mandated by compliance requirements, involves periodically rotating data encryption keys for the data at rest encryption (D@RE). Moreover, customers of data storage equipment and/or services may ask for key rotation (rekeying) on their existing configuration.

However, some conventional data storage platforms may not support a D@RE rekey feature because of certain hardware limitations. Nevertheless, the techniques disclosed herein may provide a solution without impacting the system redundancy.

On some conventional data storage platforms, when D@RE is enabled, a unique drive key is generated for each drive when it is consumed by a RAID group or a pool. If the logical data is managed through a RAID group, all the drive keys associated with that RAID group are managed together. A key can only be deleted when the RAID group or pool is destroyed.

Some customers may asking for rekeying of their data. A true rekey involves reading the data out with the old encryption key and writing it back with a new encryption key. However, the above-described conventional data storage platforms may have limited resources such that a RAID group level rekey can't be supported. A rekey of a pool is even harder to achieve.

For some systems, the processing circuitry may support proactive disk copy capability. When such a system predicts a drive is close to its end-of-life-cycle, the system automatically initiates the copying of data from the failing drive to a new drive. A new encryption key is generated for the new drive as part of this process. During proactive copy phase, the software keeps track of the progress and makes sure that new writes are properly directed. And proactive copy does not put a raid group or a pool in degraded mode.

In accordance with certain embodiments, solving the rekey requirement involves utilizing the proactive copy feature. Here are the steps:
1. Label the target RAID Group for rekeying.
2. Pick a drive from the target RAID group, and initiate a proactive copy by marking a drive as end-of-life.
   2a. As part of this, select/activate a spare drive with a new data encryption key.
   2b. Copy the data from the end-of-life drive to the spare drive.
3. Monitor/report the data copying progress.
4. Once the copy completes, clear the end-of-life marker and revive the drive.
5. Rotate through all the drives within a RAID group or a pool with steps 2-4.

After rotating through all the drives within the target RAID group, all the data in the RAID group has been re-encrypted using new disk encryption keys.

In contrast, a less-desirable or conventional approach could require reading data into the system cache and then writing data back to the same drive, encrypted with a new key. Accordingly, the less-desirable approach consumes system cache and impacts the host I/O performance.

Certain improved techniques allow the customer to rekey their data without impacting redundancy and system performance. Additionally, such improved techniques enable leveraging of the proactive disk copying capability so that it only consumes backend bus bandwidth, does not consume system cache resources, and does not impact system front I/O performance.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the particular techniques disclosed here may be applied to various types of data storage equipment equipped with storage devices such as solid state devices (SSDs), hard disk drives (HDDs), other types of storage drives, combinations thereof, etc. Such modifications and enhancements are intended to belong to various embodiments of the disclosure.

What is claimed is:

1. A method of rekeying information to maintain data security, the method comprising:
   identifying a first storage drive as a source device available to a proactive copy service;
   identifying a set of second storage drives as a set of spare devices available to the proactive copy service; and
   invoking the proactive copy service which, in response to being invoked, transfers information from the first storage drive to the set of second storage drives, the information being encrypted by a first key when residing on the first storage drive and being encrypted by a set of second keys when residing on the set of second storage drives, the first key being different from each second key.

2. A method as in claim 1 wherein invoking the proactive copy service includes:
   triggering the proactive copy service to read encrypted data from the first storage drive identified as the source device, decrypt the encrypted data into exposed data using the first key, re-encrypt the exposed data into re-encrypted data using the set of second keys, and write the re-encrypted data on to the set of second storage drives identified as the set of spare devices.

3. A method as in claim 2 wherein the first storage drive and the set of second storage drives reside within a data storage array that performs data storage operations on behalf of a set of hosts;
   wherein the data storage array is constructed and arranged to provide the proactive copy service to proactively copy data from identified source devices to identified spare devices when the identified source devices are deemed to be in end-of-life (EOL) states; and
   wherein triggering the proactive copy service includes:

setting an EOL marker for the first storage drive before the first storage drive naturally reaches the EOL state to begin a proactive copy operation which transfers the information from the first storage drive to the second storage drive while the data storage array performs data storage operations on behalf of the set of hosts.

4. A method as in claim 3, further comprising:
after the proactive copy operation has completed, clearing the EOL marker for the first storage drive to enable the first storage drive to operate as a healthy source device.

5. A method as in claim 2 wherein invoking the proactive copy service further includes:
prior to triggering the proactive copy service, detecting that a time of life for the first key has reached a predetermined value;
wherein the proactive copy service is triggered in response to detecting that the time of life for the first key has reached the predetermined value.

6. A method as in claim 2, further comprising:
after the re-encrypted data has been written on to the set of second storage drives, identifying the first storage drive as a spare device available to the proactive copy service to enable the proactive copy service to write information from another storage drive to the first storage drive.

7. A method as in claim 2 where the first storage drive belongs to a plurality of storage drives of a redundant array of independent disks (RAID) group; and
wherein the method further comprises:
invoking the proactive copy service for each storage drive of the plurality of storage drives other than the first storage drive to fully rekey information of the RAID group.

8. A method as in claim 2 where the first storage drive belongs to a plurality of storage drives of a mapped redundant array of independent disks (RAID) pool; and
wherein the method further comprises:
invoking the proactive copy service for each storage drive of the plurality of storage drives other than the first storage drive to fully rekey information of the mapped RAID pool.

9. A method as in claim 2 wherein identifying the first storage drive as the source device available to the proactive copy service includes enabling the proactive copy service to obtain access to the first key from a key server that manages a respective cryptographic key for each storage drive; and
wherein identifying the second storage drive as the spare device available to the proactive copy service includes enabling the proactive copy service to obtain access to the second key from the key server.

10. A method as in claim 1 wherein the first storage drive and the set of second storage drives are constructed and arranged to maintain data in response to host input/output (I/O) operations; and
wherein invoking the proactive copy service includes rekeying the data independently of the host I/O operations.

11. Data storage equipment configured to rekey information to maintain data security, comprising:
memory; and
control circuitry coupled to the memory, the memory storing instructions which, when carried out by the control circuitry, cause the control circuitry to:
identify a first storage drive as a source device available to a proactive copy service,
identify a set of second storage drives as a set of spare devices available to the proactive copy service, and
invoke the proactive copy service which, in response to being invoked, transfers information from the first storage drive to the set of second storage drives, the information being encrypted by a first key when residing on the first storage drive and being encrypted by a set of second keys when residing on the set of second storage drives, the first key being different from each second key.

12. Data storage equipment as in claim 11 wherein the control circuitry, when invoking the proactive copy service, is constructed and arranged to:
trigger the proactive copy service to read encrypted data from the first storage drive identified as the source device, decrypt the encrypted data into exposed data using the first key, re-encrypt the exposed data into re-encrypted data using the set of second keys, and write the re-encrypted data on to the set of second storage drives identified as the set of spare devices.

13. Data storage equipment as in claim 12 wherein the first storage drive and the set of second storage drives reside within a data storage array that performs data storage operations on behalf of a set of hosts;
wherein the data storage array is constructed and arranged to provide the proactive copy service to proactively copy data from identified source devices to identified spare devices when the identified source devices are deemed to be in end-of-life (EOL) states; and
wherein the control circuitry, when triggering the proactive copy service, is constructed and arranged to:
set an EOL marker for the first storage drive before the first storage drive naturally reaches the EOL state to begin a proactive copy operation which transfers the information from the first storage drive to the second storage drive while the data storage array performs data storage operations on behalf of the set of hosts.

14. Data storage equipment as in claim 13 wherein the control circuitry is further constructed and arranged to:
after the proactive copy operation has completed, clear the EOL marker for the first storage drive to enable the first storage drive to operate as a healthy source device.

15. Data storage equipment as in claim 12 wherein the control circuitry, when invoking the proactive copy service, is further constructed and arranged to:
prior to triggering the proactive copy service, detecting that a time of life for the first key has reached a predetermined value;
wherein the proactive copy service is triggered in response to detecting that the time of life for the first key has reached the predetermined value.

16. Data storage equipment as in claim 12 wherein the control circuitry is further constructed and arranged to:
after the re-encrypted data has been written on to the set of second storage drives, identifying the first storage drive as a spare device available to the proactive copy service to enable the proactive copy service to write information from another storage drive to the first storage drive.

17. Data storage equipment as in claim 12 where the first storage drive belongs to a plurality of storage drives of a redundant array of independent disks (RAID) group; and
wherein the control circuitry is further constructed and arranged to:

invoke the proactive copy service for each storage drive of the plurality of storage drives other than the first storage drive to fully rekey information of the RAID group.

18. Data storage equipment as in claim 12 where the first storage drive belongs to a plurality of storage drives of a mapped redundant array of independent disks (RAID) pool; and wherein the control circuitry is further constructed and arranged to:
invoke the proactive copy service for each storage drive of the plurality of storage drives other than the first storage drive to fully rekey information of the mapped RAID pool.

19. Data storage equipment as in claim 12 wherein the control circuitry, when identifying the first storage drive as the source device available to the proactive copy service, is constructed and arranged to enable the proactive copy service to obtain access to the first key from a key server that manages a respective cryptographic key for each storage drive; and wherein the control circuitry, when identifying the second storage drive as the spare device available to the proactive copy service, is constructed and arranged to enable the proactive copy service to obtain access to the second key from the key server.

20. A computer program product having a non-transitory computer readable medium which stores a set of instructions to rekey information to maintain data security; the set of instructions, when carried out by computerized circuitry, causing the computerized circuitry to perform a method of:

identifying a first storage drive as a source device available to a proactive copy service;

identifying a set of second storage drives as a set of spare devices available to the proactive copy service; and invoking the proactive copy service which, in response to being invoked, transfers information from the first storage drive to the set of second storage drives, the information being encrypted by a first key when residing on the first storage drive and being encrypted by a set of second keys when residing on the set of second storage drives, the first key being different from each second key.

* * * * *